Figure 1:
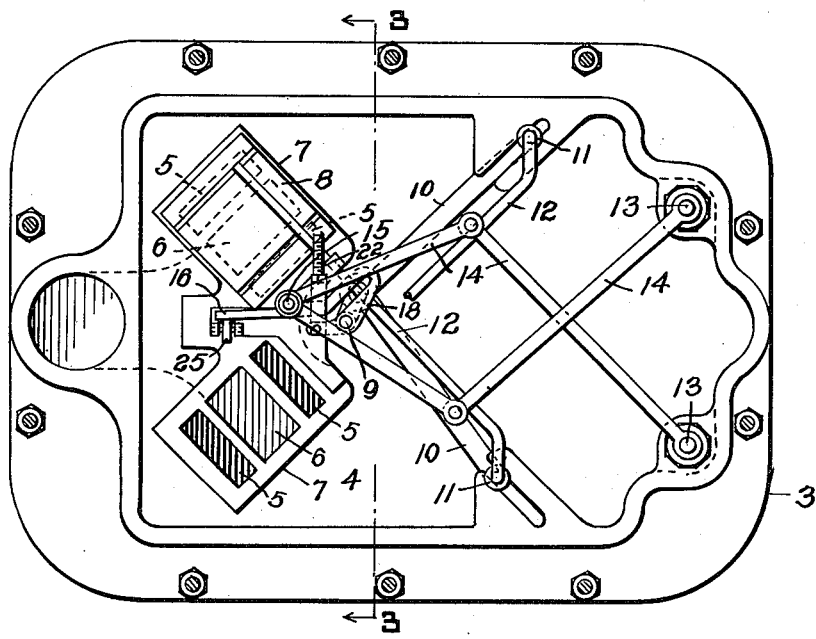

J. R. ARMSTRONG.
GAS METER.
APPLICATION FILED JULY 31, 1915.

1,212,729.

Patented Jan. 16, 1917.
2 SHEETS—SHEET 1.

WITNESSES

INVENTOR

J. R. ARMSTRONG.
GAS METER.
APPLICATION FILED JULY 31, 1915.
1,212,729.
Patented Jan. 16, 1917.
2 SHEETS—SHEET 2.
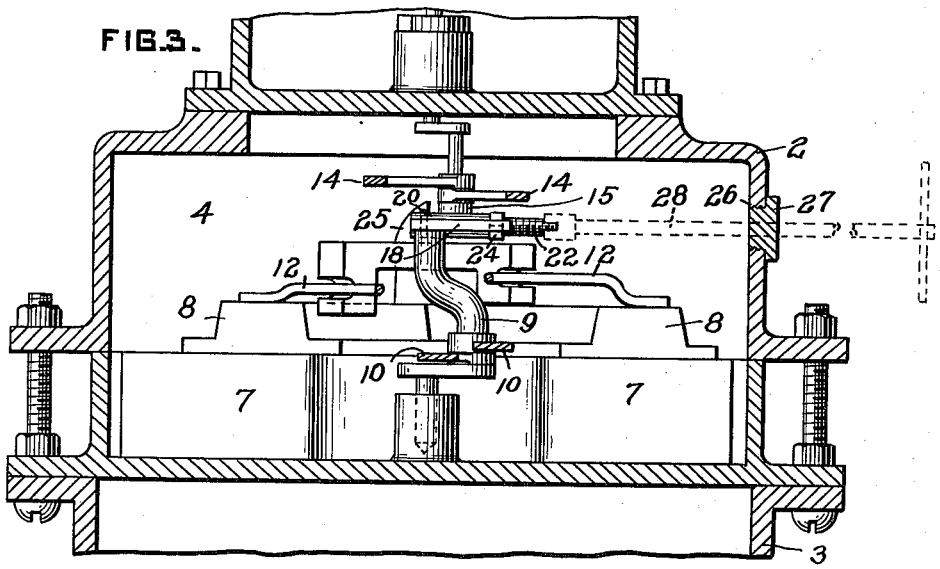
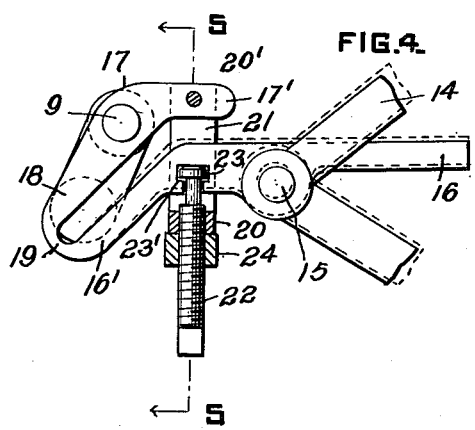
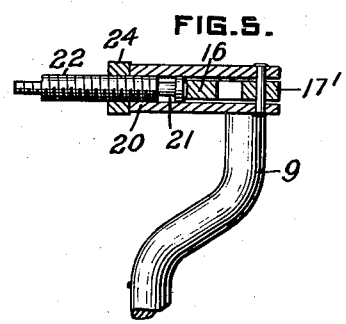
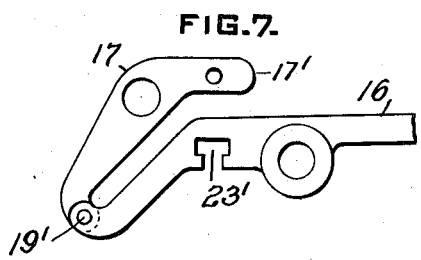
WITNESSES
INVENTOR

UNITED STATES PATENT OFFICE.

JAMES R. ARMSTRONG, OF PITTSBURGH, PENNSYLVANIA, ASSIGNOR TO EQUITABLE METER COMPANY, OF PITTSBURGH, PENNSYLVANIA, A CORPORATION OF PENNSYLVANIA.

GAS-METER.

1,212,729.  Specification of Letters Patent.  Patented Jan. 16, 1917.

Application filed July 31, 1915. Serial No. 42,940.

*To all whom it may concern:*

Be it known that I, JAMES R. ARMSTRONG, a citizen of the United States, and resident of Pittsburgh, in the county of Allegheny and State of Pennsylvania, have invented certain new and useful Improvements in Gas-Meters, of which the following is a specification.

The primary object of this invention is to provide simple and efficient adjusting means for varying the position of the tangent post relatively to the valve-actuating crank shaft, in the preferred embodiment a single adjustment being utilized for either increasing or decreasing the radius of the tangent post as may be necessary for either increasing or decreasing the movement of the flag rods and the rod-actuating diaphragms to secure accurate operation of the meter.

A further object is to provide adjusting means which while serving to vary the radius of the tangent post also operates to vary the angular position of the same relatively to the crank shaft, thereby simplifying the adjusting operation and usually rendering it possible to accomplish by one operation what heretofore has required two separate adjustments. As to the angular adjustment, the invention herein dispenses in a large measure with the tedious manipulation heretofore necessarily incident to soldering and unsoldering the connection between the tangent arm and crank shaft when making such adjustment.

Another object is to provide adjusting means that is readily accessible from the exterior of the meter, rendering it unnecessary to take the meter apart or to remove its top in order to gain access to the parts to be manipulated.

The adjustments referred to are well understood by those skilled in the art. Unless the movements of the diaphragms and the flag rods accord with the valves, the gas flow will not be measured accurately, the meter indicating either more or less than the actual flow, depending on the deficiency in the adjustment. Again, a meter that will accurately register a comparatively small flow will not maintain the same accuracy with a materially larger flow, even though the main pressure may be the same in both instances. If accurate for a small flow, at which time the diaphragms are afforded maximum travel, the tendency will be to under-measure a more copious flow. It is, therefore, the practice to set the meter with reference to the average demands thereon so that the variations either way will be minimized as far as possible.

The invention as here illustrated is applied to a double meter of the construction shown in patent granted to me May 20, 1913, No. 1,062,268, although it will be understood that the invention is not limited in this regard, the improvements being applicable to meters of various types.

Figure 2:
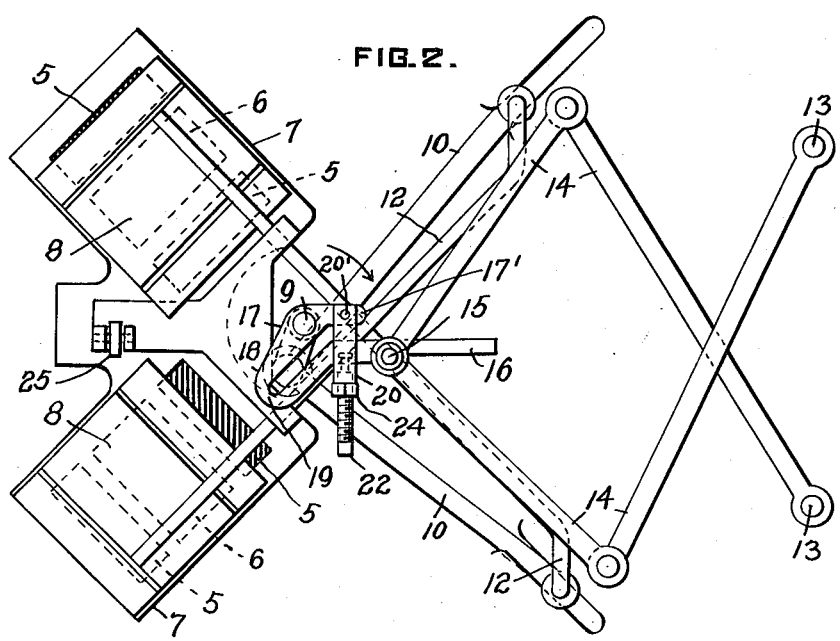

In the accompanying drawings, Figure 1 is a top plan view of the meter body with chamber-forming top structure removed. Fig. 2 is a detail plan view on a larger scale of the valves and the valve-actuating crank shaft and the operative connections between the flag rods and said shaft, the same being illustrated in connection with my improved adjusting means. Fig. 3 is a vertical cross-section on line 3—3 of Fig. 1, illustrating the position of the parts when adjusting the same from the exterior of the meter. Fig. 4 is a detail view of the specific mechanism embodying the invention, and Fig. 5 is a section taken on line 5—5 of Fig. 4. Fig. 6 is a detail view of the stop device for preventing backward movement of the mechanism. Fig. 7 is a view of a portion of the mechanism shown in Fig. 4, illustrating a slight modification.

Referring to the drawings, 2 designates the cap-like upper portion of the meter body 3, the cavity inclosed by the cap forming a gas-receiving chamber 4 from which the gas flows through ports 5 into the several measuring pockets of the meter body, and from said pockets the gas is discharged through ports 6 to the meter outlet and service line. Each port 6 is arranged in a valve seat 7 between two ports 5, and the ports of each set are controlled by slide valve 8, all as more particularly shown and described in my above mentioned patent.

The valves are actuated through the medium of a crank shaft 9 which is operatively connected to the diaphragm flag rods and to the valves. The actuating means for each valve consists of a link 10 which is connected to the crank of shaft 9 and with the outer end of the link connected at 11 to one end of rod 12 with the opposite end of the rod secured to the valve. Thus it will be seen that the crank shaft is positively secured to each valve and hence its travel is always the same, just as in my above mentioned patent.

The variable element is embodied in the connection between the flag rods 13 and crank shaft whereby the extent of movement of the flag rods, and of the diaphragms (not shown) for actuating the flag rods, may be varied as accurate adjustment of the meter may require. Extending from each flag rod are the jointed arms or links 14 having their free ends secured to the tangent post 15. The post is carried by tangent arm 16 which is spaced from and flexibly connected to support 17 secured to the upper end of shaft 9. In the adaptation shown in Figs. 1 to 4, said connection consists of the looped extension 18 of support 17 which is adapted to flex at extremity 19 of the loop when moving tangent arm 16 toward and from support 17. In the arrangement shown in Fig. 7, the flexible connection is embodied in the pivot joint 19' at the outer extremity of the looped portion.

For adjusting tangent arm 16 relatively to support 17 and thereby changing the position of post 15 relatively to crank shaft 9 a screw adjustment is provided between an arm 17' of support 17 and the tangent arm, said connection consisting of a clevis-like casing 20 which is slotted at 21 for the passage of arm 16, the casing being pivoted to support arm 17' as indicated at 20'. A threaded stem 22 is extended through the threaded aperture in the end of casing 20, and at its inner end is formed with swivel head 23 which is embraced by offset slot 23' in arm 16, a lock nut 24 being provided on stem 22 for maintaining the adjustment at which the parts may be set.

It will be noted that the loop formation, formed in part by portion 18 of support 17 and in part by the inner portion 16' of tangent arm 16, is disposed at an angle oblique to a line intersecting the centers of crank shaft 9 and tangent post 15, the result being that when screw stem 22 is adjusted for contracting the space between support 17 and the tangent arm the resulting movement draws the tangent post toward shaft 9, and also moves the tangent post in an arc centered about point 19 (or 19'), thereby also changing the angular position of the post relatively to the shaft. Hence, the movement afforded by screw 22 accomplishes a two-fold adjustment.

Heretofore two separate adjustments have been necessary, in the types of meters generally used one of these adjustments being accomplished by loosening the soldered connection between the tangent arm and the crank shaft, and not infrequently this connection must be changed several times before the valves are given the desired "lead." With the improvement herein, after the parts have been initially assembled with a fair degree of accuracy, the final angular adjustment of the tangent post is effected by the single screw stem. With the swivel connection of the latter to the tangent arm, it is apparent that movement in either direction will change the angularity of the tangent post in a most advantageous direction for the simultaneous shortening or lengthening of the distance between crank shaft 9 and the tangent post. If the throw of the flag rods and their connected diaphragms is to be lengthened, as is desirable when the flow of gas is relatively small, stem 22 is retracted, thereby increasing the distance between the crank shaft and the tangent post and correspondingly increasing the orbit of the latter. And this same operation changes the angularity of the tangent post in a direction to prevent the valve from closing until the flag rods and diaphragms have reached the position most desirable for such slower movement. Adjustment of stem 22 in the opposite direction decreases the orbit of tangent post 15, and the resulting change in the angularity of said post increases the "lead" of the valves, thereby lengthening the momentary period intervening between the closing of the valves and the completion of the diaphragm movement. This results in shutting off the gas before the diaphragms are fully distended, but not before the more copious flow has had time to pass the requisite amount of gas to the measuring chamber.

It will of course be understood that, in accordance with the usual practice, the adjustment is had by connecting the meter with a standard instrument, the adjusting means being manipulated in one direction or the other as may be necessary to cause the meter to conform with such instrument. While both adjustments herein provided for have heretofore been accomplished, each has required a separate manipulation, there having been no provision for combining them in one and the same instrumentality, nor for synchronizing them in such manner that the angular adjustment would be in keeping with the desired variation in the distance between the crank shaft and tangent post.

In order that the adjustment may be accomplished without taking the meter apart or even removing the chamber-forming cap 2, the gravity latch 25, ordinarily arranged in the path of the tangent arm for preventing the meter from running backward but not interfering with its forward movement, is utilized for properly positioning and holding the mechanism when the same is to be adjusted. Thus, as in Fig. 1, with arm 16 bearing backwardly on stop 25, shown more clearly in the detail of Fig. 6, screw stem 22 is in line with an opening 26 in the wall of cap 2, Fig. 3, this opening being normally closed by plug 27. Upon removing the plug a wrench 28 may be inserted for engaging the extremity of stem 22 and rotating the stem to either contract or expand the movably connected parts depending on the adjustment to be accomplished. Opening 26 is sufficiently large to also pass a suitable wrench (not shown) for manipulating the lock nut 24. By this means the meter may be conveniently and quickly adjusted for accurately measuring the gas flow. The troublesome and delicate operation of changing the soldered connection between the tangent arm and crank shaft is obviated, for with a fairly accurate initial adjustment, any deviation either way may be corrected by changing the angle of the tangent post.

I claim:

1. In a gas meter, the combination of a valve-actuating crank shaft, a tangent post rotatable with the shaft, means for varying the position of the post relatively to the shaft and a plurality of flag rods each pivotally connected to the tangent post, whereby adjustment of the post relatively to the crank shaft correspondingly adjusts the connection between said shaft and each of the flag rods.

2. In a gas meter, the combination of a valve-actuating crank shaft, a tangent post, a tangent post support adjustably secured to said shaft, support adjusting means, and a plurality of flag rods each pivotally connected to the post, whereby adjustment of the post support relatively to the crank shaft correspondingly adjusts the connection between said shaft and each of the flag rods.

3. In a gas meter, the combination of a valve-actuating crank shaft, a tangent post, a post support secured to the shaft and also movable relatively thereto in direction to at once change the angular position of the post and to vary the distance between the post and shaft, support moving means, and a plurality of flag rods each pivotally connected to the post, whereby movement of the post support relatively to the crank shaft correspondingly varies the connection between the shaft and each flag rod.

4. In a gas meter, the combination of a meter casing having an opening through which an adjusting tool may be entered, a valve-actuating crank shaft, a tangent post movable with and adjustable relatively to the crank shaft, stop means for holding the shaft against backward movement, and post adjusting means accessible through the casing opening when the shaft is being held against backward movement.

5. In a gas meter, the combination of a meter casing having an opening through which an adjusting tool may be entered, a valve-actuating crank shaft, a tangent arm rotatable with the shaft and a tangent post carried by the arm, a stop device in the path of the arm and adapted to be displaced by forward movement of the arm but adapted to prevent backward movement thereof, the post being adjustable relatively to the crank shaft, and post adjusting means rotatable with the shaft and having position accessible through the casing opening when the tangent arm is being held against backward movement by the stop device.

6. In a gas meter, the combination of a valve-actuating crank shaft, arm-like supports rigid with and projecting in different directions from the crank shaft, a tangent post, a tangent arm spaced from and flexibly secured to one of said support arms, and adjusting means secured to the tangent arm and to the other of said support arms for adjusting the tangent arm to vary the distance between the crank shaft and the tangent post.

7. In a gas meter, the combination of a valve-actuating crank shaft, a tangent post, a post support secured to the shaft and also movable relatively thereto in direction to at once change the angular position of the post and to vary the distance between the post and shaft, and support moving means.

8. In a gas meter, the combination of a valve-actuating crank shaft, a support rigid with the shaft, a tangent post, a post-support flexibly secured to and movable relatively to the shaft-carried support in directions to at once change the angular position of the tangent post and to vary the distance between said post and crank shaft, and support moving means.

9. In a gas meter, the combination of a valve-actuating crank shaft, a support rigid with the shaft, a tangent post, a post-carrying arm flexibly secured to said support and movable relatively thereto for varying the distance between the post and crank shaft, an adjusting screw having a swivel connection with said arm, and a casing secured to said support and in which the screw is adjustable.

10. In a gas meter, the combination of a valve-actuating crank shaft, a support rigid with the shaft, a tangent post, a post-carrying arm spaced from and movably secured to said support, a casing having a threaded aperture, the casing secured to the support and slotted to embrace the arm for affording the latter movement toward and from the support, and a screw adjustable in the casing and having a swivel connection with the arm.

11. In a gas meter, the combination of a casing having an opening through which an adjusting tool may be entered, a valve-actuating crank shaft, a support rigid with the shaft, a tangent post, a post-carrying arm spaced from and movably secured to said support, a casing secured to the support and having a threaded aperture, an adjusting screw in said aperture and connected to said arm, and stop means for preventing backward movement of the shaft, the adjusting screw being in position accessible through said casing opening when the shaft is being held against backward movement by the stop means.

In testimony whereof I affix my signature in presence of two witnesses.

JAMES R. ARMSTRONG.

Witnesses:
ALEX. S. MABON,
J. M. NESBIT.